Figure 1:
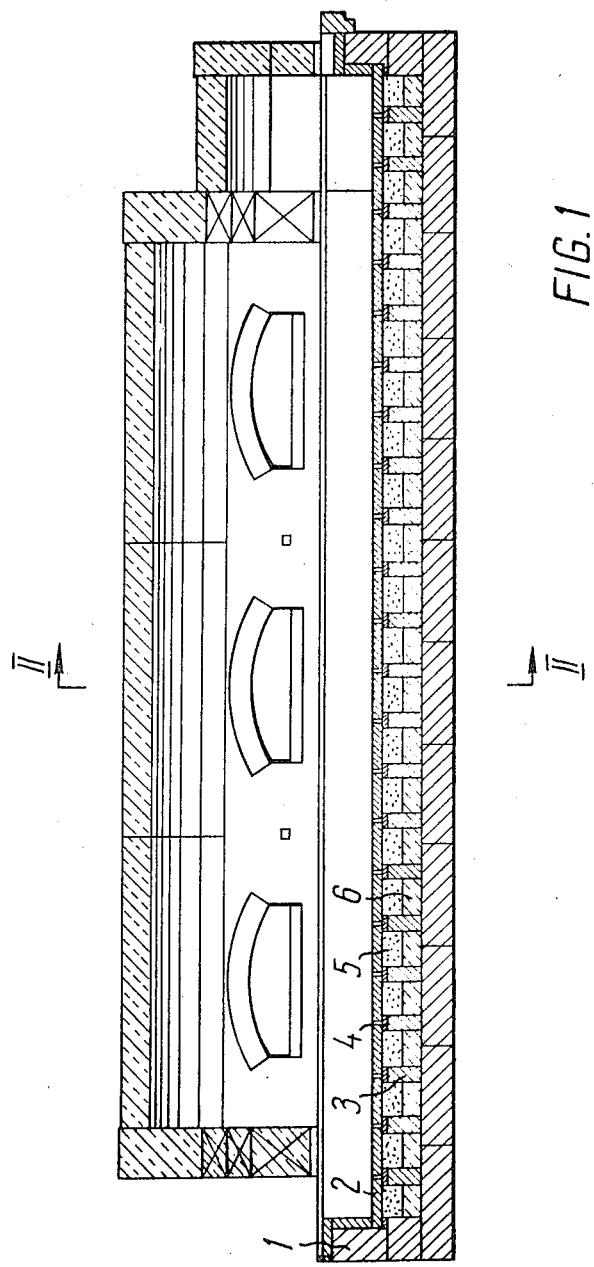

17. An arrangement as defined in claim 1, wherein different ones of said crushing rollers are rotatable at different speeds for thereby adjusting and maintaining the height of the accumulated mound of treated solids.

18. An arrangement as defined in claim 17; and further comprising radiant-energy emitters and radiant-energy receivers located at mutually opposite sides of said conduit in transverse alignment at different levels, for sensing the height of said mound.

19. An arrangement as defined in claim 18, wherein said emitters are isotope radiators.

20. An arrangement as defined in claim 17, wherein the mound of treated solids emits radiant energy; and further comprising a plurality of radiant-energy receivers arranged at different levels of said conduit for sensing the emitted radiant energy of said mound and for thereby sensing the height of the latter.

21. An arrangement as defined in claim 20, wherein said radiant-energy receivers comprise photoconductive cells and amplifiers cooperating with said cells.

22. An arrangement as defined in claim 17; and further comprising a control device associated with each of said crushing rollers for varying the speed of rotation thereof as a function of changes in the height of said mound.

23. An arrangement as defined in claim 17; further comprising a control device associated with each of said crushing rollers operable for varying the speed of rotation thereof, and for sensing changes in the height of said mound; signal-generating means for generating a signal in response to impulses received from the respective control device; manually operable means for actuating said control device to thereby vary the speed of rotation of the associated crushing rollers; and intermittently operating means for intermittently actuating said control devices.

24. An arrangement as defined in claim 1; further comprising coarse-crushing rollers mounted for rotation above said crushing rollers; and protective elements mounted above said coarse-crushing rollers and extending transversely of said conduit.

25. An arrangement as defined in claim 24; and cooling means for cooling said protective elements.

26. An arrangement as defined in claim 24, wherein at least some of said coarse-crushing rollers are mounted for height-adjustment in said conduit.

27. An arrangement as defined in claim 1; and further comprising openings in said conduit for insertion into the latter of auxiliary elements operative for disintegrating large-dimensioned solids.

28. An arrangement as defined in claim 1, said withdrawing means including a conveyor having a run provided with an upwardly inclined section; and thermal-sensing means for sensing the temperature of said conveyor and for indicating the sensed temperature.

29. An arrangement as defined in claim 28, wherein said conveyor is a belt conveyor.

30. An arrangement as defined in claim 28, wherein said conveyor is a bucket conveyor.

31. An arrangement as defined in claim 1, said supply means directing said streams of cooling air upwardly at constant pressure; and wherein said crushing rollers effect alteration in the height of the mound of accumulated treated solids so as to maintain the rate of airflow constant by such alterations.

32. An arrangement as defined in claim 1; and further comprising additional supply means for directing additional cooling air into said conduit above said crushing rollers.

33. An arrangement as defined in claim 32; further comprising at least one substantially mushroom-shaped baffle arranged in said conduit above said crushing rollers; and wherein said additional supply means directs said additional cooling air from below in upward direction against said baffle.

34. An arrangement as defined in claim 33, said conduit comprising an intermediate portion having a cross section which diverges in direction from said upper towards said lower portion; further comprising a plurality of injecting nozzles communicating with the interior of said conduit in the region of said intermediate portion; and wherein said additional supply means also communicates with said injection nozzles for directing further cooling air through said nozzles into said conduit.

35. An arrangement as defined in claim 34, wherein said injection nozzles extend substantially radially with reference to the longitudinal axis of said conduit.

36. An arrangement as defined in claim 34, wherein said injection nozzles extend substantially tangentially with reference to the longitudinal axis of said conduit.

37. An arrangement as defined in claim 34, wherein said nozzles are inclined in downstream direction.

38. An arrangement as defined in claim 34; further comprising a source of cooling air; supply conduits connecting said source with said supply means and with said additional supply means, and connecting said additional supply means with said nozzles; and adjusting means for adjusting the proportions of cooling air flowing through the respective supply conduits.

39. An arrangement as defined in claim 38, said adjusting means being manually operable adjusting means.

40. An arrangement as defined in claim 38, said adjusting means being automatic adjusting means effecting adjusting of the proportions of cooling air flowing through the respective supply conduits as a function of predetermined reference parameters.

41. An arrangement as defined in claim 32; further comprising first and second blower means respectively cooperating with said supply means and said additional supply means for supplying cooling air thereto.

42. An arrangement as defined in claim 1; further comprising reversing means for periodically reversing the direction of rotation of said crushing rollers.

43. An arrangement as defined in claim 1; further comprising manually operable reversing means for reversing the direction of rotation of said crushing rollers at the will of an operator.

* * * * *

GLASS TANK FURNACE

The present invention relates to glass manufacture and more particularly to glass tank furnaces for producing preferably glass-ceramic materials.

There are known in the prior art glass tank furnaces whose melting bath is made of some refractory material such as fireclay bricks, opaque melted quartz, mullite, and the like.

These refractory materials are capable of withstanding the action of aggressive glass melts only under conditions wherein the furnace walls are drastically cooled.

However, the melt of a glass-crystalline material is much more aggressive than that of a glass melt. Therefore, if no artificial cooling of the furnace is employed, the service life of the furnace is limited to a maximum of 2-3 months. With the use of artificial cooling of the outer walls and bottom, a glass tank furnace can operate without repairing for as long as a year.

The artificial cooling of the outer walls and bottom of the tank, however causes crystallization of glass melt at the place of contact with the refractory walls and bottom of the tank.

Depending on the depth of the melt in the melting bath and the temperature distribution throughout it, the crystallized layer can reach a fairly high level (up to one half of the total depth). With the two layers available in the tank—the upper molten one, and the lower, crystallized one—the production of articles of a uniform crystalline structure is hindered by entrapment in the upper layer of crystal inclusions which differ from the melt both in physical and chemical properties.

An object of the present invention is to eliminate the disadvantages of the conventional glass tank furnaces.

The principal object of the invention is to develop such a design for the furnace, as will ensure its prolonged service life without repairs and with no artificial cooling required.

The above object is achieved by providing a glass tank furnace whose inner surfaces contacting the melt are lined with a metal layer forming part of the refractory brickwork of the furnace.

Good practice is to employ a metal having a melting point not lower than 1,400° C. in order to make a layer lining the internal surface of the furnace.

With a view to preventing melt leakages through the tank bottom due to insufficient density of the metal layer, it is advisable to place a layer of a granular refractory material between the metal layer and the refractory brickwork of the furnace. Thus, the leaking melt, passing into the refractory granular material, crystallizes in it, thus forming a plug preventing further leakage.

In order to maintain the temperature with in the granular material at the upper limit of the crystallization temperature range and without decreasing the temperature of the bottom melt layer, a heat-insulating foam-type refractory material is used below the granular refractory material.

Figure 2:
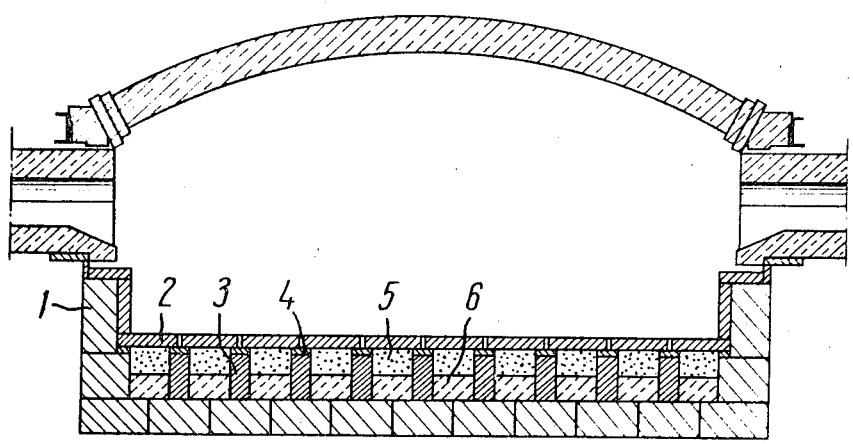

The details of the present invention will become more fully apparent from a consideration of the following description of an exemplary embodiment thereof, taken in conjunction with the accompanying drawings, in which:

FIG. 1 is a longitudinal section of a glass tank furnace constructed in accordance with the present invention; and FIG. 2 shows a section of the furnace along line II—II in Fig. I.

The bottom and walls of the tank furnace are constructed of refractory brickwork 1. The furnace is internally lined with metal plates forming a protective layer 2.

These metal plates can be made of any metal whose melting point is above the melt temperature, for example of a Fe-Cr-Al alloy, for which the melting point is somewhat in excess of 1,500° C.

The bottom plates bear against supports 3 made of refractory bricks and furnished with top plates in the form of strips 4, which are made of a heat-resisting metal. Plates of the metal layer 2 are directly mounted on these top plates.

The sidewall plates of the metal layer 2 are fixed on the columns of the furnace framework (not shown in the drawings).

Two layers of a refractory material are additionally laid on the furnace bottom between the refractory brickwork 1 and the layer 2. The first material is placed directly under the layer 2 and is composed of a granular refractory material 5, for instance, sand; the second is a foam-type lightweight refractory brickwork 6 located directly between the refractory brickwork 1 and the granular material 5.

In the case of melt leaking through the furnace bottom, the melt enters the granular material 5, crystallizes in it, plugs the flow and stops further leakage of the melt.

The foam refractory material 6 functions as a thermal-insulating interlayer and serves to prevent the temperature from dropping in the granular material below the upper limit of the melt crystallization. As a result of this, the possibility of crystallization in the bottom layer of the melt is eliminated in the furnace.

The present furnace requires no artificial cooling and, therefore, it is freed from any crystallization within its bottom and wall zones when melting not only conventional glass, but also glass-crystalline materials, assuring good quality of the material produced in the furnace.

What we claim is:

1. A glass tank furnace comprising sidewalls and a bottom each including an underlying refractory brick base, metal plates on and covering the refractory brick of said sidewalls, refractory brick supports on the refractory brick of the bottom, said supports being spaced longitudinally and transversely throughout said furnace, heat-resistant metal strips on said supports, metal plates mounted on said strips to provide an inner lining at the bottom of the furnace, said metal plates on the sidewalls and on the supports being of a metal whose melting point is above 1,400° C., a layer of foam-type refractory heat-insulative material on said brick base of said bottom in the spaces between the supports, and a granular refractory material between the refractory material on the brick base of said bottom and said metal plates on said supports completely filling the spaces therebetween for crystallizing melt leaking past said metal plates to prevent further leakage.

2. A tank furnace according to claim 1 wherein the metal is a Fe-Cr-Al alloy.

3. A tank furnace according to claim 1 wherein the granular refractory material is sand.

* * * * *